United States Patent [19]
Sugimoto et al.

[11] Patent Number: 4,608,001
[45] Date of Patent: Aug. 26, 1986

[54] SCROLL TYPE FLUID MACHINE WITH ANGULAR ADJUSTMENT MEANS

[75] Inventors: Tamio Sugimoto; Yoshimitsu Fukazawa; Kunio Yamaguchi, all of Biwajima, Japan

[73] Assignee: Mitsubishi Jukogyo Kabushiki Kaisha, Japan

[21] Appl. No.: 713,192

[22] Filed: Mar. 18, 1985

[30] Foreign Application Priority Data

Mar. 21, 1984 [JP] Japan .................................. 59-52276
Aug. 28, 1984 [JP] Japan .......................... 59-129322[U]

[51] Int. Cl.[4] ......................... F01C 1/04; F01C 19/00; F01C 21/00; B23P 15/00

[52] U.S. Cl. ........................................ 418/55; 418/57; 418/109; 29/156.4 R

[58] Field of Search .................... 418/55, 57, 107-109; 29/156.4 R

[56] References Cited

U.S. PATENT DOCUMENTS

| | | | |
|---|---|---|---|
| 1,441,375 | 1/1923 | Rolaff | 418/108 |
| 3,874,827 | 4/1975 | Young | 418/55 |
| 3,924,977 | 12/1975 | McCullough | 418/57 |
| 4,300,875 | 11/1981 | Fischer et al. | 418/57 |

FOREIGN PATENT DOCUMENTS

| | | | |
|---|---|---|---|
| 55-35152 | 3/1980 | Japan | 418/57 |

*Primary Examiner*—John J. Vrablik
*Attorney, Agent, or Firm*—McGlew and Tuttle

[57] ABSTRACT

In a scroll type fluid machine wherein there are engaged stator scroll means and rotary scroll means in intermeshing relationship with each other, each having a spiral or scroll blade portion projecting in the axial direction from the lateral plate surface in such a manner that the rotary scroll means may move in solar revolving motion with respect to the stator scroll means mounted stationary on a cup-like member by the rotating motion of a main shaft, while restricting the rotating motion of the rotary scroll means by function of a rotation blocking mechanism, so that the fluid may operatively be sucked into and delivered out of the fluid machine with a differential pressure produced therein in continued variation, an improvement is accomplished in that an angular phase relationship between the rotary scroll means and the stator scroll means may be compensated properly by shifting in rotation the rotary scroll means in the direction of rotating motion thereof in accordance with the extent of initial wear generated in the both scroll means, and also in that a substantial reduction in the assembly procedures of the scroll type fluid machine may be attained from an improved construction made available in alignment work of the both scroll means involved.

6 Claims, 13 Drawing Figures

SCROLL TYPE FLUID MACHINE WITH ANGULAR ADJUSTMENT MEANS

BACKGROUND OF THE INVENTION (i) Field of the Invention

The present invention relates generally to a fluid machine, and more particularly to a scroll type fluid machine such as a compressor, an expander, a pump, etc.

(ii) Description of the Prior Art

Referring firstly to FIGS. 1 through 7, there is shown a typical construction of a conventional scroll-type compressor, taken for example, which is generally known in the art of the fluid machine. As shown in FIGS. 1 and 2, there is provided a housing designated at the reference numeral 10, which comprises a cup-shaped portion 12 and a front end plate 11 for closing the open end of the cup-shaped portion. This cup-shaped portion 12 is securely fixed in position to the front end plate 11 by way of fitting bolts 17 which extend longitudinally through bolt holes 123 defined in the open circumferential edge of the portion 12 and through bolt holes 113 defined in the circumferential edge of the front end plate 11. There is secured in position a flanged cylindrical sleeve 15 projecting forwardly as viewed in the figure at the frontal end surface of the front end plate 11, and there is seen mounted rotatably a main shaft 14 extending longitudinally along the central axes of the sleeve 15 and of the front end plate 11 through ball bearings 16, 13, respectively. Also, according to another arrangement as typically shown in FIG. 2, there may be provided O-rings 30 for sealing hermetically the interior of the housing 10 in the positions of engagement between the outer circumferential surface of the front end plate 11 and the inner circumferential surface complementary therewith of the cup-shaped portion 12, and between the frontal end surface of the front end plate 11 and the lateral side of the flanged sleeve 15, respectively. As seen in FIG. 2, the main shaft 14 extending longitudinally through the central openings of the sleeve 15 and the front end plate 11 may also be supported rotatably by way of a shaft sealing member 32 in addition to the ball bearings 16, 13.

Referring to the both drawing FIGS. 1 and 2, there are shown incorporated in the housing 10 a stator scroll element 20, a rotary scroll element 21, and a driving and rotation-blocking mechanism 22 for the rotary scroll element 21 to be described more in detail later. Also, it is seen that the stator scroll element 20 is comprised of a lateral plate portion 201, a spiral or scroll blade portion 202 and a web portion 203 formed projecting from the surface of the lateral plate portion 201, which stator scroll element is secured stationary in position to the cup-shaped portion 12 by way of bolts extending through a bottom portion 121 of the cup-shaped portion 12. The interior space of the housing 10 is separated into a suction chamber 25 and a delivery chamber 26 by having the mating gap between the outer circumferential surface of the lateral plate portion 201 and the inner circumferential surface of the cup-shaped portion 12 filled sealingly with certain appropriate means like the O-ring 30. There is defined a through opening 31 in the central area of the lateral plate portion 201 for having a closed space 23 defined between the both scroll elements 20, 21 in communication with the delivery chamber 26.

It is also seen that the rotary scroll element 21 is comprised of a lateral plate portion 211 and a spiral or scroll blade portion 212 formed projecting from the inner surface thereof. It is arranged that this rotary scroll element 21 is placed with its scroll blade portion 212 in intermeshing engagement relationship with the complementary scroll blade portion 202 of the stator scroll element 20 at 180 degrees apart with each other, when installed in position within the housing 10. There is defined the enclosed space 23 having the both scroll elements 202 and 212 in contact relationship with each other at plural points, when put in the mutual engagement position. More specifically, at the moment of closing motion of the rotary scroll element 21, or in other words, when the outer ends of the blade extensions of the both scroll elements 202 and 212 come to be in contact with the flanks of the opposing elements 212 and 202 engaged with each other, there are four points of contact A, B, C and D as typically shown in FIG. 5. For making certain of the proper positioning relationship of these scroll elements when engaged with each other, there are provided positioning holes 208 and 218 in the stator scroll element 20 and the rotary scroll element 21, respectively, at a point on the Y-axis passing the center of solar revolutionary motion Os of the rotary scroll element 21 (that is, the axis of the main shaft 14 or the center of the stator scroll element 20) and crossing at the right angle with a line segment connecting the points of contact A and B, or connecting the points C and D. Also, there is formed threads 209 in part of the positioning holes 208 as shown in FIG. 1, and also there is formed a through hole 122 in the bottom portion 121 of the cup-shaped portion 12 on the same axis as that of the positioning hole 208.

Now, referring to FIGS. 1 through 3, there is shown a typical construction of the rotation-blocking mechanism 22 for the rotary scroll element 21, which comprises a ring-shaped stationary race 221 embedded securely in the inner surface of the front end plate 11, a stationary ring 222 opposite this stationary race 221 fixed abutting the inner surface of the front end plate 11, a ring-shaped stationary race 214 embedded securely in the outer surface of the lateral plate portion 211 of the rotary scroll element 21, a movable ring 215 opposite the ring-shaped stationary race 214 fixed abutting the outer surface of the lateral plate portion 211, and a plurality of ball elements 224 engaged in operative position in a corresponding number of pockets **222*a* and 215*a* defined extending in the axial direction through the stationary ring 222 and the movable ring 215, respectively. When the rotary scroll element 21 is caused to move in solar rotating motion in the clockwise direction as viewed in FIG. 3, the movable ring 215 will followingly therewith be put to move in similar solar revolutionary motion with its center defining a circle of radium Ror. During this motion, on the part of the rotary scroll element 21 there is produced a turning effort or moment in the clockwise direction as viewed in the figure according to a current extent of deviation in the working points of reactive motion and of driving efforts of the fluid to be compressed in the enclosed space 23. Under such an operating condition, there is such an effect that the rotary scroll element 21 will likely be rotated in the clockwise direction about the center of the movable ring 215**.

However, as nine balls 224 shown in this figure are caught between the edges of the pockets **222*a* in the stationary ring 222 and the edges of the pockets 215*a*** provided in the movable ring 215, this movable ring cannot rotate, accordingly. In consequence, the rotating motion of the rotary scroll element 21 can now be prevented from occurring, accordingly.

In the operating position shown, the rotating center of the movable ring 215 is located at the furthest right point of motion as viewed in the figure, and thus the current aspect of distribution of the effects of inhibiting the rotating motion is then as schematically shown by the arrows $fc_1$ through $fc_5$. In this position, therefore, the ball 224 at the highest point shown would have a greatest possible contribution to the effect of inhibiting the rotating motion, this effect attenuating as it departs from this specific highest point, and hence, resulting in the nine ball elements 224 existing in the lower half part effecting no substantial contribution to the retarding of the rotating motion of the system, at all.

In the meantime, the current pressure or thrust as applied upon the rotary scroll element 21 in the axial direction thereof from the reactive force from the current compressive efforts would then be held effectively at the ring-shaped stationary race 214 and the ring-shaped stationary race 221 through all the ball elements 224.

Now, reference is made to the driving mechanism for the rotary scroll element 21. An enlarged portion 141 formed in the inner end of the main shaft 14 is held by way of the ball bearing 13. Also, there is provided a driving pin (not shown) as projecting in the axial direction in the leading end surface of the enlarged portion 141 at the offset position from its center. On the other hand, there is mounted rotatably a bushing 27 of disc or stub shape having a substantial thickness in an annular boss 213 projecting from the lateral plate portion 211 of the rotary scroll element 21 by way of a needle bearing 28. This bushing 27 is formed with a balance weight 271 of disc configuration extending integrally therefrom in the radial direction, and having an eccentric recess extending axially in a position offset from the center Oc of the bushing 27. In this offset recess, there is fitted operatively the driving pin noted above, and the bushing 27 is held rotatably in position by way of the needle bearing.

With such construction, it is arranged that the fluid as taken into the enclosed space 23 by the solar revolutionary motion of the rotary scroll element 21 is then delivered out of the delivery port 31. During the operation, it is noted that there is effected a reactive force from the compression of the fluid upon the rotary scroll element 21 in the tangential direction to its locus of circular motion through the scroll blade portion 212. This force will render an eventual effect upon the center Oc of the bushing 27 as shown by an arrow Fd in FIG. 4. Because of such an arrangement that the bushing 27 may move in rotation about the drive pin, there is effected the turning moment about the center Od of the driving pin as represented by the arrow Fd. When there is an angle $\theta$ defined between the segment in the direction of the force Fd and a segment passing the center Oc of the bushing 27 and the center Od of the drive pin, this moment may be represented with the equation: $Fd \cdot \epsilon_2 \sin \theta$. In consequence, the rotary scroll element 21 held operatively upon the bushing 27 is then subjected to a turning moment existing about the center Od of the drive pin. Accordingly with this effect, the scroll blade portion 212 is now caused to be urged against the scroll blade portion 202. With this urging force being Fp, the following equation may be obtained from the relationship: $Fp \cdot \epsilon_2 \cos \theta = Fd \cdot \epsilon_2 \sin \theta$, i.e., $$Fp = Fd \cdot \tan \theta$$

More specifically, when the bushing 27 having the eccentric opening and the rotary scroll element 21 are caused to be driven, there will automatically be produced an urging effort at the areas of line contact between the both scroll blade portions 212 and 202 from the reactive effect of the compressed fluid, which would then ensure the sealing effect of the enclosed space 23, accordingly.

In addition, it is arranged as stated hereinbefore that the center Oc of the bushing 27 is rotatable about the center Od of the drive pin. In this connection, it is to be noted that when the thickness of the scroll blade portions 202 and 212 would vary, for instance, from a possible error in their design dimensions, the distance between the centers Oc and Os may be adjusted accordingly. More specifically, the center Oc may, as typically shown in FIG. 4, be shifted over to a point Oc' or Oc", for instance, along the arc having the radius $\epsilon_2$ from the center Od. In consequence, therefore, it is advantageous that the rotary scroll element 21 may move smoothly, even with such an error in its design dimensions.

When assembling such a scroll type compressor as noted above, the cup-shaped portion 12 and the front end plate 11 are initially to be erected together, by screwing the bolts 17 into the bolt holes 113, 123. As the next step, the indexing holes 208 and 218 provided respectively in the stator scroll element 20 and the rotary scroll element 21 are then put to be aligned with each other. Subsequently, there is inserted an alignment rod 18 from a through hole 122 defined in the bottom part 121 of the cup-shaped portion 12 into the indexing holes 208, 218. In consequence, therefore, it is notable that the rotary scroll element 21 may have a certain degree of freedom in play within a given range of angles about the installed alignment rod 18. More specifically, the rotary scroll element 21 may shift within a given extent of play of the bushing 27, thus affording the shifting motion of the pockets 215a defined in the movable ring 215 with a certain range of angles equivalent to the range of angular movement allowed on the part of the bushing 27, accordingly. Now, referring to the rotation block mechanism 22 for holding the self-rotating motion of the rotary scroll element 21 from occurring, this mechanism when in operation is held in close engagement relationship with the edges of the pockets 215a and 222a of the movable ring 215 and of the stationary ring 222, respectively. With such close engagement, there may be ensured a proper angular positioning in intermeshing engagement between the stator scroll elements 20 and 21. For this operation, the front end plate 11 upon which the stationary ring 222 is mounted is to be shifted in rotating motion in the direction opposite that of the main shaft 14 so that the ball elements 224 may operatively be caught by the edges of the pockets 222a of the stationary ring 222 and the pockets 215a of the movable ring 215, respectively. This is the proper procedure for angular positioning of the both stator and movable scroll elements 20 and 21 placed in the intermeshing relationship with each other. In this connection, it is to be noted that the inner diameter of the bolt hole 113 provided in the front end plate 11 is made greater than the outer diameter of the bolt 17. With this arrangement, it is possible in practice that the front end plate 11 may be shifted in rotating motion in the direction opposite that of the main shaft 14, with the bolts 17 left inserted into the bolt holes 123 in the cup-shaped portion 12. By securing the bolts 17 subsequently, the front end plate 11 and the cup-shaped portion 12 may be fixed securely to a properly jointed state, thereby resulting in a proper intermeshing engagement between the both stator and movable scroll elements 20 and 21 at all. Upon the securing of the bolts 17, the cup-shaped portion 12 and the front end plate 11 are now jointed positively with each other, thereafter removing the alignment rod 18 out of the through hole 122. Subsequently, there is inserted a bolt 19 into engagement with the threads 209 of the indexing hole 208 provided in the stator scroll element 20 from the through hole 122, thus having the both indexing holes 208, 218 and the through hole 122 secured in the properly aligned state as shown in FIG. 6 or FIG. 7.

Now, the following is the summary of the conventional assemble procedures as noted hereinbefore.

(1) Erect initially the cup-shaped portion 12 and the front end plate 11 by inserting the bolts 17 into the bolt holes 113 and 123;

(2) Put the indexing holes 208 and 218 provided respectively in the stator scroll element 20 and the rotary scroll element 21 in alignment with each other, and then insert the alignment rod 18 into these indexing holes 208, 218;

(3) Shift the front end plate 11 in rotating motion in the direction opposite that of the main shaft 14 till it stops;

(4) Secure completely the cup-shaped portion 12 and the front end plate 11 together by the bolts 17;

(5) Finally, remove the alignment rod 18, and then insert and secure the bolt 19 so that the cup-shaped portion 12 and the front end plate 11 are secured together in position.

However, such drawback could not be avoided when assembling the scroll type fluid machine in accordance with the conventional manner, as follows. (I) When setting the intermeshing angular relationship of the both scroll elements 20, 21 as noted above, the scroll blade portions 202, 212 of the both scroll elements 20, 21 come to a mutual contact relationship with each other accordingly with their initial frictions of contact, thus determining a current radius of motion in the circular locus of the rotary scroll element 21. Now, when this radius of motion increases, even if that radius of motion is followed closely by means of the driving mechanism of the rotary scroll element 21, it is inevitable that there would remain a substantial deviation in the locational phases of the rotary scroll element 21 around the drive shaft center of the rotary scroll element 21 with respect to the stator scroll element 20. For this reason, a substantial gap would then be left between the opposed flanks or side surfaces of the both scroll blade portions 202, 212, thus resulting in a substantial quantity of gas leaked from this gap, which would lead to the eventual problem of lowering performance of the compressors. (II) In accordance with the conventional assembly procedures noted above such that after the insertion of the alignment rod 18 into the indexing holes 208, 218, the front end plate 11 is shifted in rotation in the direction opposite that of the main shaft 14 till it stops, and thereafter the cup-shaped portion 12 and the front end plate 11 are secured together, unavoidable problems of such as complex procedures and as increased steps of procedures would then be left unattended accordingly.

SUMMARY OF THE INVENTION

The present invention is therefore materialized to practice in view of such circumstances and inconveniences as noted above and is essentially directed to the provision of an improved scroll type fluid machine, which can afford an efficient solution to these problems, accordingly.

(1) It is an object of the present invention to provide an improved scroll type fluid machine wherein a gap formed between the opposed flanks of the adjacent scroll blade portions of the complementary scroll elements in the fluid machine owing to an initial wear generated therein during the break-in operation of the machine is accordingly compensated for, so that it may be eliminated and so that any leakage of gas from this gap may efficiently be prevented from occurring.

(2) It is another object of the invention to provide an improved scroll type fluid machine wherein there is afforded a substantial reduction in the steps of assembly procedures of the fluid machine.

According to the substantive entity of the present invention, there is provided, as briefly summarized, an improvement relating to the construction of a scroll type fluid machine such that there are engaged a stator scroll element and a rotary scroll element in intermeshing relationship with each other, each having a spiral or scroll blade portion projecting in the axial direction from the lateral plate surface in such a manner that the rotary scroll element may move in solar revolving motion with respect to the stator scroll element mounted stationary on a cup-like member by the rotating motion of a main shaft journalled on a front end plate, while restricting the rotating motion of the rotary scroll element by function of a rotation blocking mechanism incorporated between the rotary scroll element and the front end plate, so that the fluid may be sucked in and delivered out with a pressure produced therein in operative variation.

Such a construction as noted above, characterized in that (1) and (2) respectively as follows.

(1) The efficient assembly to advantage in such a manner that the angular phase relationship between the rotary scroll element and the stator scroll element may be compensated properly by shifting in rotation in the direction of rotating motion of the rotary scroll element in accordance with the extent of initial wear generated in these scroll elements.

(2) The construction to advantage such that there is provided grooves extending in each of the opposed mating surfaces of the front end plate and the cup-shaped member, respectively, and that there is installed a resilient element into the space defined by these grooves in the two members so that the front end plate may adjustably be shifted in rotating motion with respect to the cup-shaped member for the purpose of allowing an erection work thereof at the installation stage.

With the advantageous construction as noted above, there is attainable such effect and function from the present invention, as follows.

(1) There will be formed no appreciable gap between the opposed flanks of the rotary scroll element and the stator scroll element when installed in intermeshing relationship with each other and when there may occur a substantial deviation in the mutual angular phase relationship therebetween owing to the initial wear generated in the flanks of these scroll elements during the break-in operation of the machine. In consequence, the fluid is thus effectively prevented from leaking out of such gap in the complementary scroll elements, thereby preventing a possibility of reduction in efficiency of the scroll type fluid machine, and thereby bringing a substantial improvement in the machine performance.

(2) When securing the front end plate and the cup-shaped member together in the installation stage, the front end plate may automatically be pulled together with the resultant effect that there is substantially no back-lash left in the intermeshing engagement of these two members, accordingly. By virtue of this effect that the front end plate may shift in rotation with respect to the cup-shaped member, there is no longer the necessity of a manual adjustment of the front end plate in the installation work at all, thereby reducing a substantial steps in the installation procedures of these members, and thereby making the rotating efforts on the front end plate substantially constant, resulting in no substantial dispersion in the quality of installation work of the scroll type fluid machine, accordingly.

The other objects, principle, property and details of the present invention will, as well as advantages thereof, become more apparent from the following detailed description by way of a preferred embodiment of the invention, when read in conjunction with the accompanying drawings.

BRIEF DESCRIPTION OF THE DRAWING

among which FIGS. 1 and 2 are longitudinal cross-sectional views showing by way of example the erected state of a fluid machine, FIG. 3 is a front elevational view showing a rotation blocking mechanism seen from the rotary scroll element side.

FIG. 4 is a graphic representation for the explanation of thrusts rendered upon the rotary scroll element, FIG. 5 is a schematic view showing the relative locations of the scroll blade portions of the rotary and stator scroll elements and of the alignment holes for the installation, FIG. 6 is a longitudinal cross-sectional view showing the general construction, when assembled completely, of the fluid machine shown in FIG. 1, and FIG. 7 is a similar cross-sectional view to FIG. 6 showing the assembled state of the fluid machine shown in FIG. 2;

DETAILED DESCRIPTION OF THE INVENTION

Figure 1:
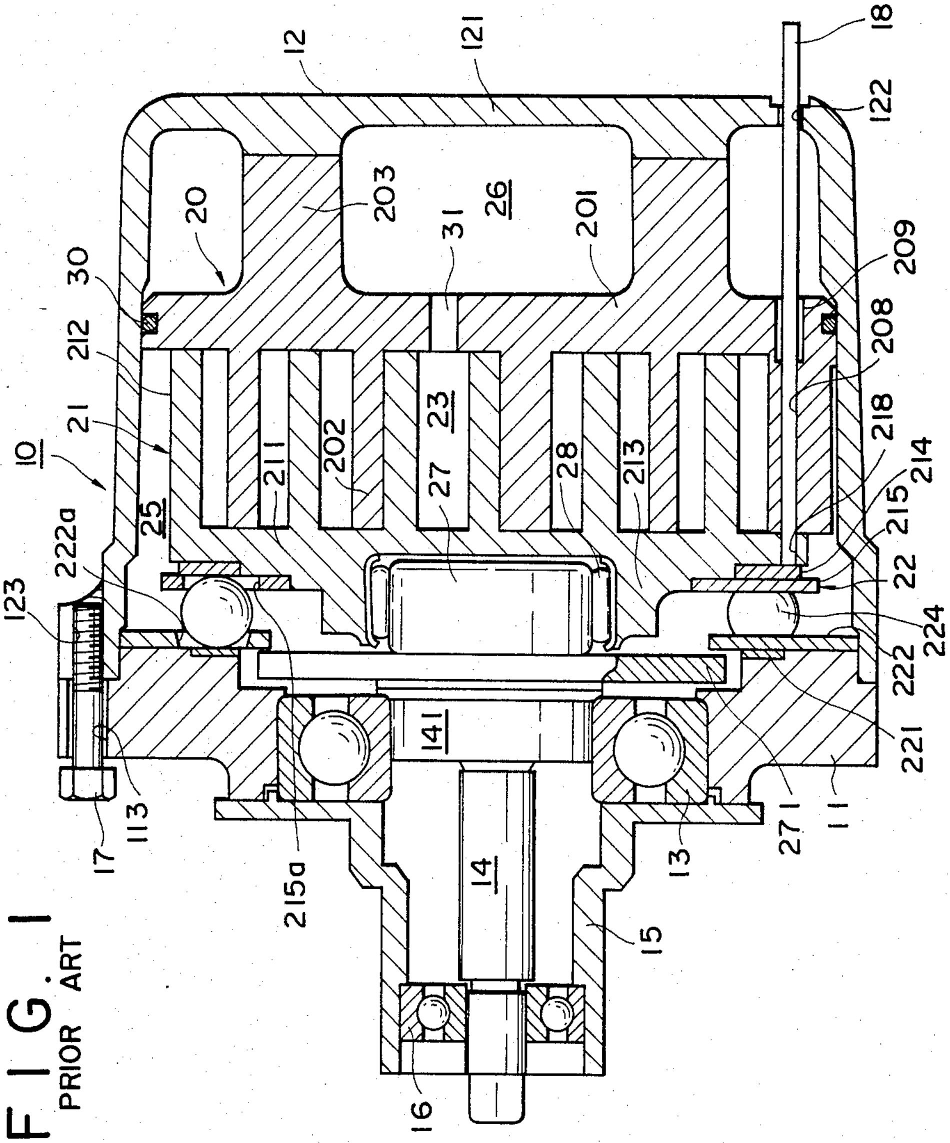
FIG. 1 PRIOR ART
FIGS. 1 through 7 are a series of representations showing the conventional constructions of the scroll-type compressor.
Figure 2:
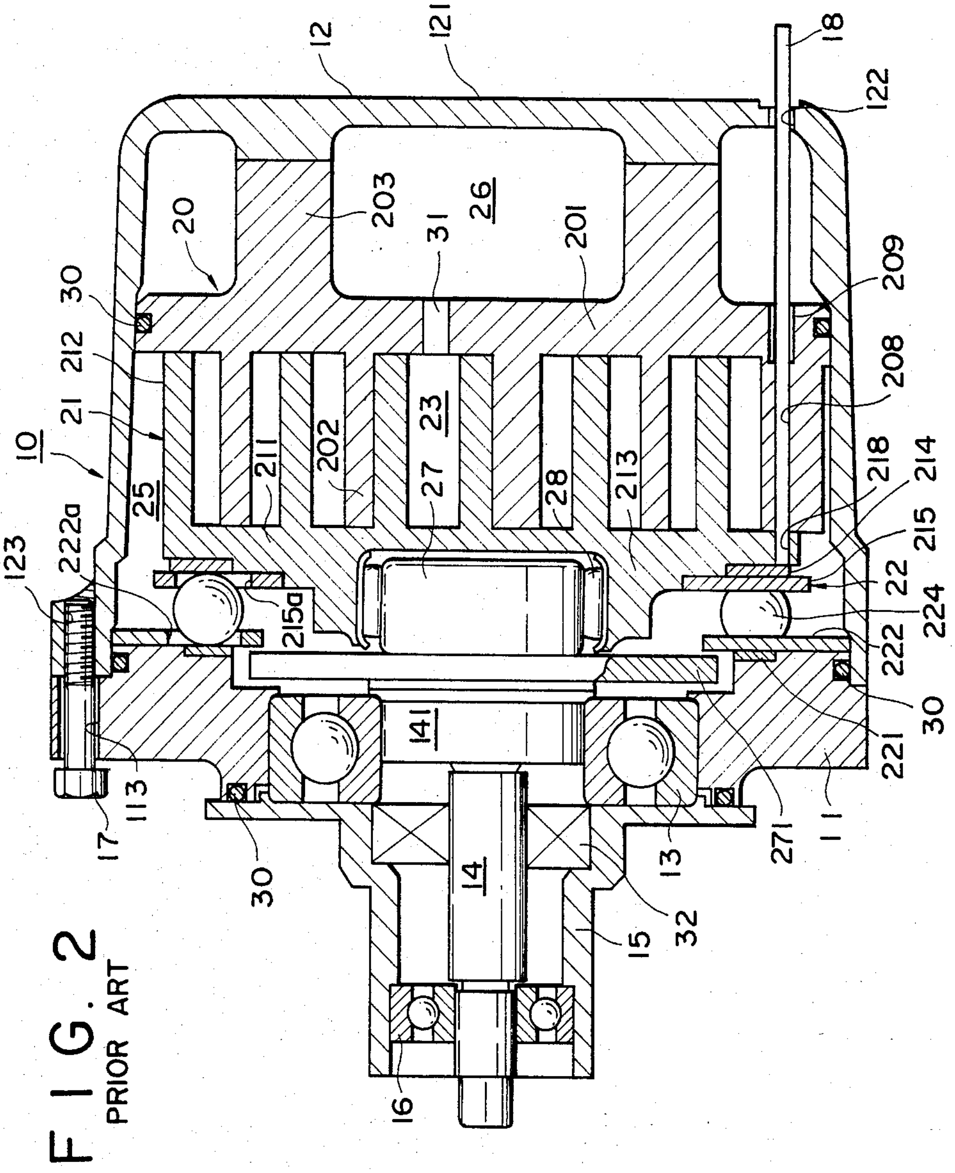
FIG. 2 PRIOR ART
Figure 3:
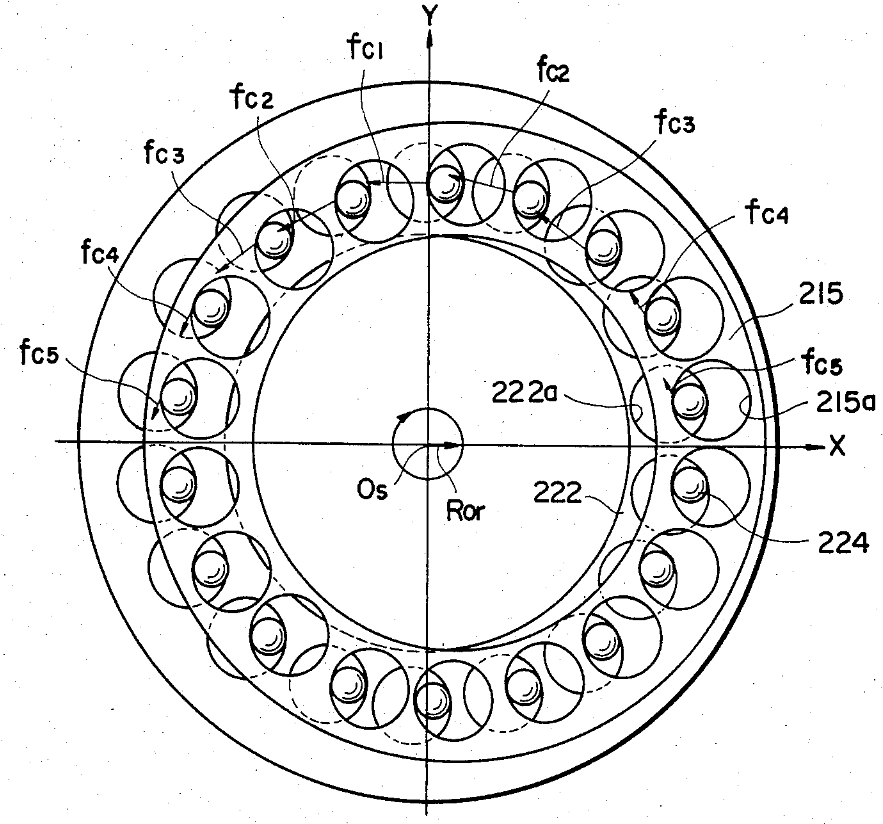
FIG. 3 PRIOR ART
Figure 4:
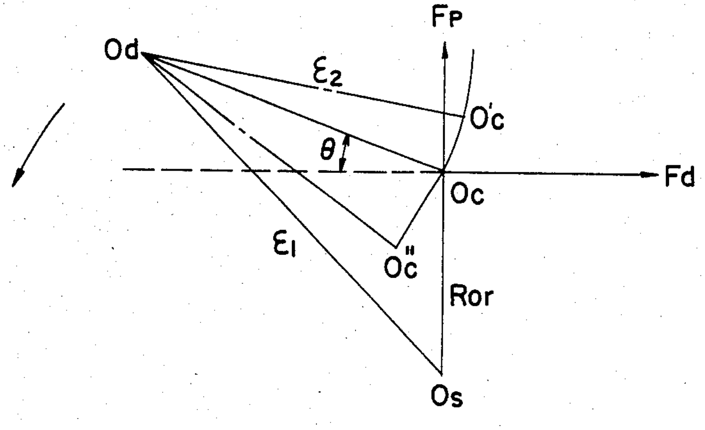
PRIOR ART FIG. 4
Figure 5:
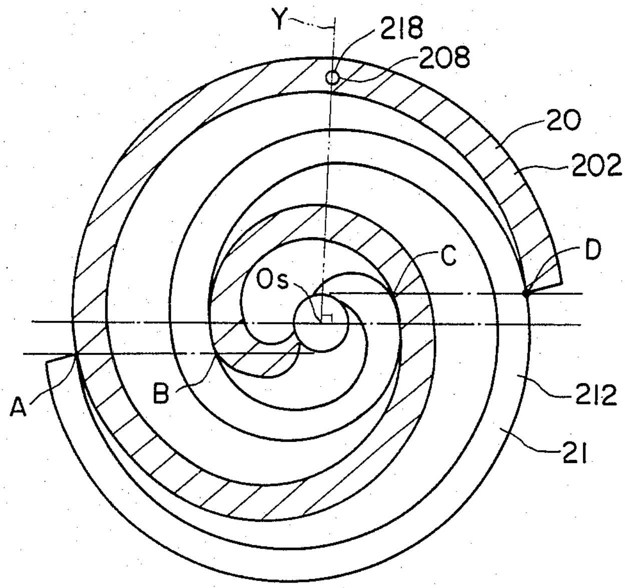
F I G. 5 PRIOR ART

The present invention will now be explained by way of a preferred embodiment thereof shown in FIG. 8 as adapted in practice to the construction of the scroll type fluid machine. Firstly, the reference is made to FIG. 8 similar to FIG. 5, in which like parts are designated at like reference numerals. In this FIG. 8, there is shown the state having the both scroll elements 202 and 212 in intermeshing relationship with each other at plural points, when put in the mutual engagement position. More specifically, at the moment of closing motion of the rotary scroll element 21, or in other words, when the outer ends of the blade extensions of the both scroll elements 202 and 212 come to be in contact with the flanks of the opposing elements 212 and 202 engaged with each other, there are four points of contact A, B, C and D as typically shown in FIG. 8. In this state, there is shown provided positioning holes 208*a* and 218 in the stator scroll element 20 and the rotary scroll element 21, respectively, in such a manner that when assuming an initial wear a $\mu$ in the flanks of the scroll blade portions 202 and 212 and with a radius b mm of the base circle of the involute curve in each of the flanks of these scroll blade portions, there is provided the positioning hole 208*a* offset in position from the complementary positioning hole 218 in the rotary scroll element 21 in the rotating direction of the main shaft 14 by an angle of $\epsilon$ rad. as determined from the equation $\epsilon = 1/1000 \cdot a/b$. Now, assuming a = 10 to 40 $\mu$ (micron), when b = 5 mm, $\epsilon$ rad. = 0.1 to 0.5 degree. In practice of course a single value for a will be used and will give a single value for $\epsilon$ rad. With this offsetting of the positioning hole 208*a* by $\epsilon$ rad. away from the positioning hole 218 in the rotary scroll element 21 in the rotating direction of the main shaft 14, and by threading the alignment rod 18 into these positioning holes 208*a* and 218 when aligned with each other, it is feasible in practice to assemble the stator scroll element 20 and the rotary scroll element 21 in position with a proper angular phase relationship adjustably shifted in rotation in the rotating direction of the rotary scroll element 21.

Figure 8:
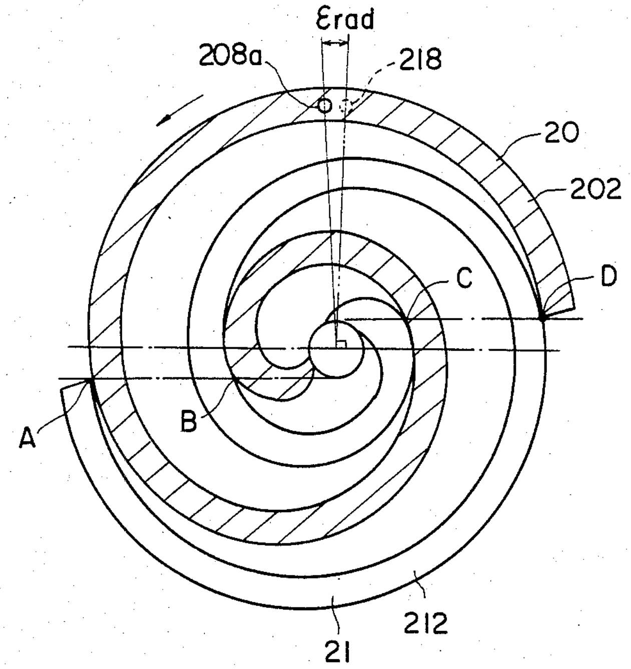
FIG. 8 is a similar front elevational view to FIG. 5 showing a preferred embodiment of the invention.
Figure 6:
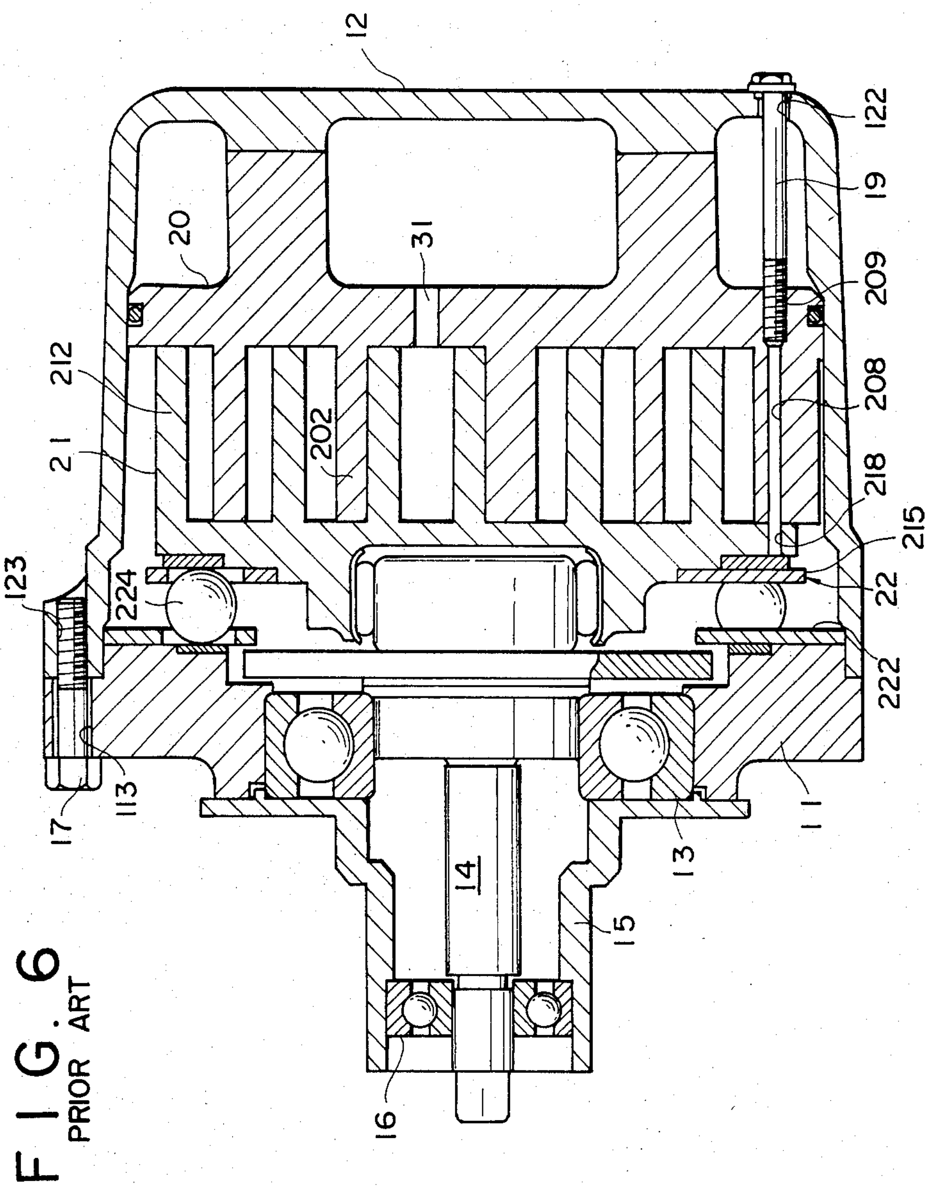
FIG. 6 PRIOR ART
Figure 7:
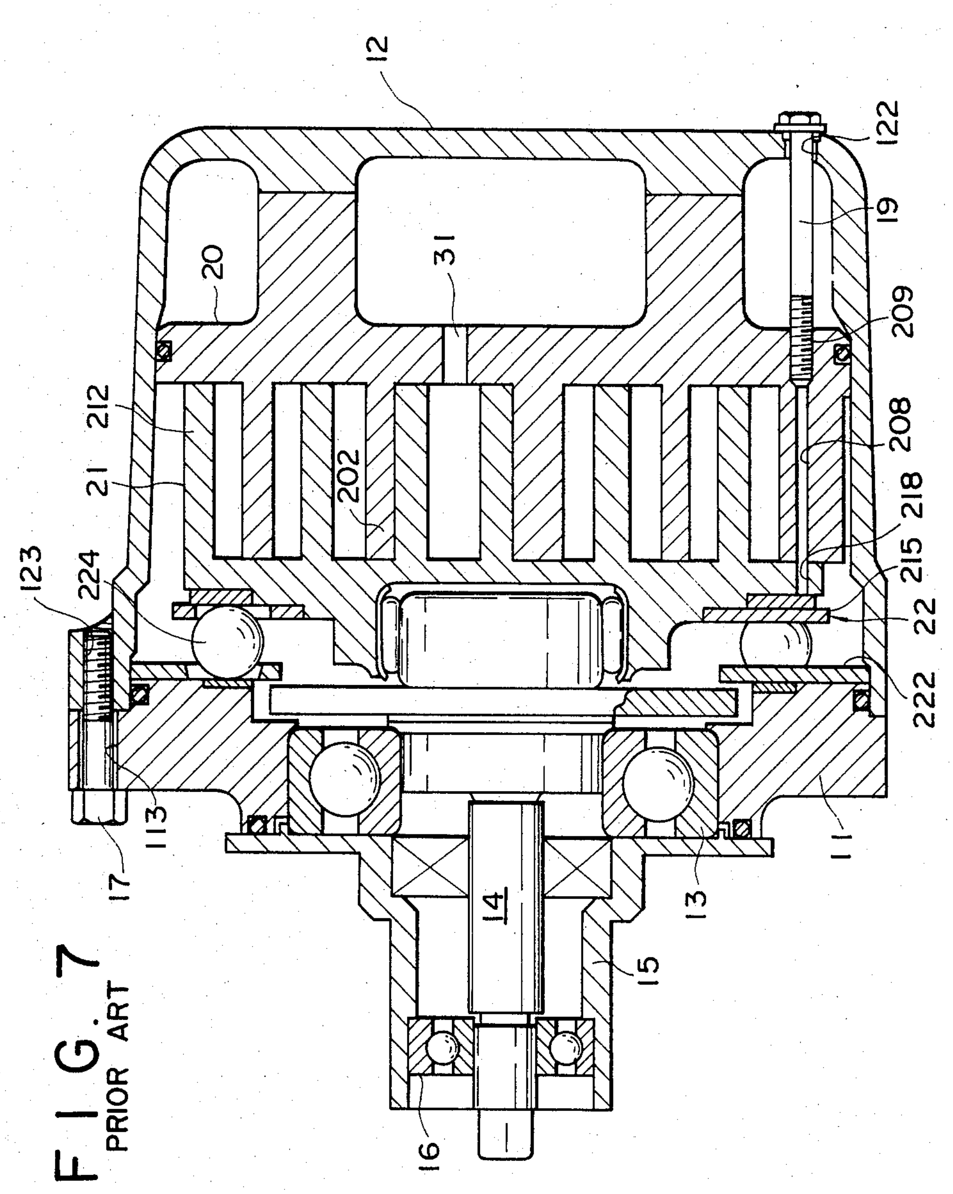
FIG. 7 PRIOR ART

The friction between the blades of the two scroll members can easily be overcome to align holes 208*a* and 218 as shown in FIG. 8. During the break-in period there will be initial wear but because of the offset of the positioning holes a good seal is still maintained after the device has been broken in.

Figure 9:
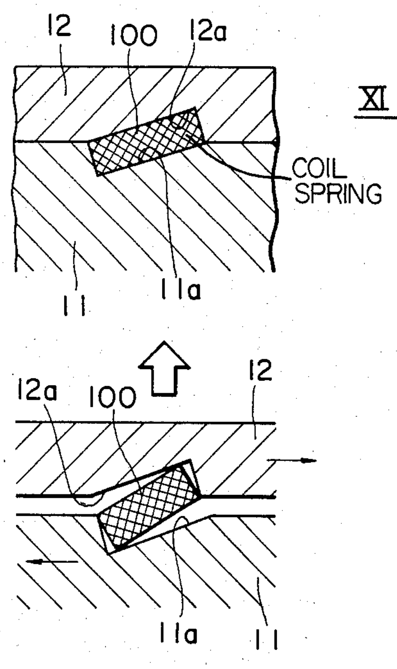
FIG. 9 is a fragmentary cross-sectional view taken along the line IX—IX in FIG. 11.
Figure 10:
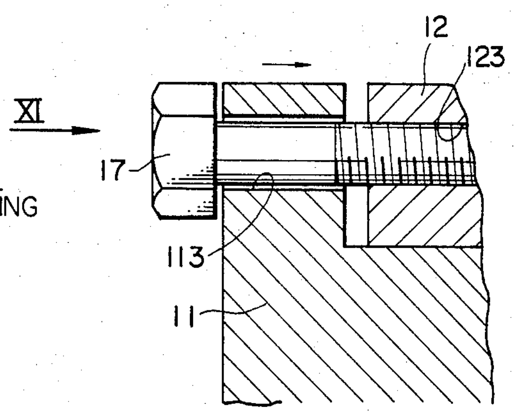
FIG. 10 is a fragmentary longitudinal cross-sectional view showing a step of installation of the bolts 17.
Figure 11:
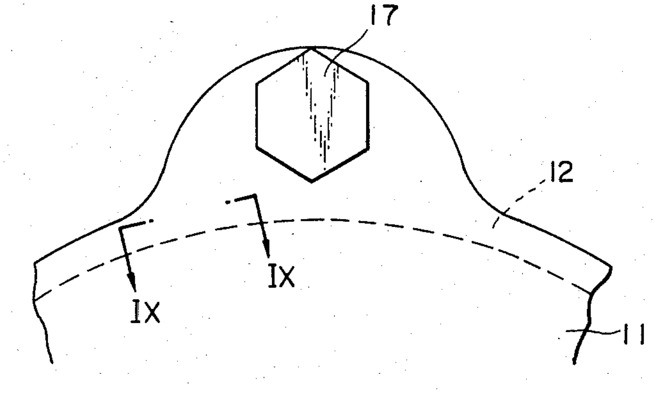
FIG. 11 is a fragmentary view seen in the direction of the arrow XI in FIG. 10.
Figure 12:
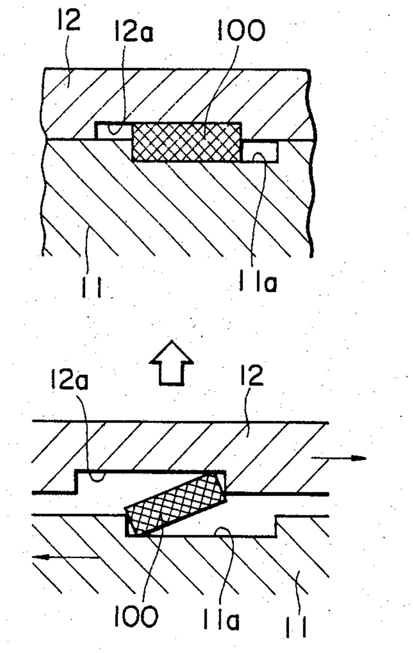
FIGS. 12 and 13 are similar fragmentary cross-sectional views to FIG. 9 showing the modifications in the constructions shown in FIGS. 9 through 11.
Figure 13:
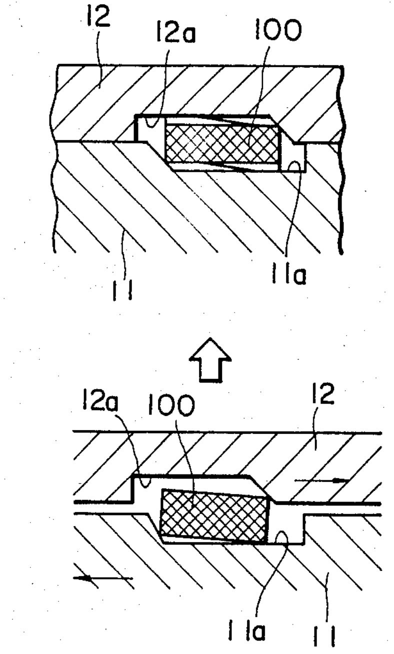

Now, referring to FIGS. 9 through 11, there are shown alternative embodiments of the present invention, among which FIG. 9 is a fragmentary cross-sectional view taken along the line IX—IX in FIG. 11, FIG. 10 is a fragmentary cross-sectional view showing the state of the bolts 17 installed into the circumferential portion of the scroll type compressor, and FIG. 11 is a similar fragmentary view seen in the direction of an arrow XI in FIG. 10, and there are provided positioning holes 208 and 218 in the stator scroll element 20 and the rotary scroll element 21, respectively. In the figures, the reference numeral 100 designates a resilient element such as a coil spring or the like, which is inserted into the space defined by a retaining groove 11*a* formed in the front end plate 11 in the complementary surface thereof and by a retaining groove 12*a* formed in the opposed surface of the cup-shaped portion 12. These retaining grooves 11*a* and 12*a* may be of a cross-sectional shape modified as shown in FIGS. 12 and 13. In brief, the construction of such retaining grooves may be of such a configuration that when securing the front end plate 11 and the cup-shaped portion 12 together by way of the bolts 17, there is provided a space suitable for the reception of the resilient element 100 so that there is no substantial back-lash left between these members, accordingly.

Now, when the scroll type compressor is assembled, the procedures is followed by virtue of the advantageous construction particular to the present invention;

(1) Initially erect the cup-shaped portion 12 and the front end plate 11 by inserting the bolts 17 into the plurality of bolt holes 113 and 123;

(2) Put the indexing holes 208 and 218 provided respectively in the stator scroll element 20 and the rotary scroll element 21 in alignment with each other, and then insert the alignment rod 18 into these indexing holes 208, 218;

(3) Secure completely the cup-shaped portion 12 and the front end plate 11 together by the bolts 17; and (4) Finally, remove the alignment rod 18, and then insert and secure the bolt 19 so that the cup-shaped portion 12 and the front end plate 11 are secured together in position.

Accordingly, when securing the front end plate and the cup-shaped member together in the assembly procedures, the front end plate may be pulled to its proper position while automatically shifting in rotation by function of the resilient element 100 installed between the front end plate 11 and the cup-shaped portion 12, with the resultant effect that there is eventually no back-lash left in the intermeshing engagement of these two members, accordingly. By virtue of this effect that the front end plate may shift in rotation with respect to the cup-shaped member, there is no longer the necessity of "the conventional manual adjustment of the front end plate 11 in rotation in the direction opposite that of the main shaft 14 till it stops" in the installation work at all, thereby reducing a substantial steps in the installation procedures of these members. In addition, it is feasible in practice to preselect the magnitude of rotating efforts on the part of the front end plate 11 from the righting moment of the resilient element 100, thus holding to a minimum a substantial dispersion in the quality of installation work of the scroll type fluid machine, accordingly.

According to the construction by way of this embodiment of the invention, it is summarized that there are provided the retaining grooves in the opposed surfaces of the front end plate 11 and the cup-shaped portion 12 of the scroll type fluid machine so that a space is defined therebetween when installed together, into which space there is inserted the resilient element in position to allow the front end plate to adjustably shift in rotating motion relatively with the cup-shaped portion during the erection thereof, and that the front end plate and the cup-shaped portion are finally secured together after a due adjustment was met accordingly between these complementary members.

Finally, it is intended that all the matter contained in the foregoing description or shown in the accompanying drawings shall be interpreted as illustrative only and shall not be taken in any way limiting sense.

It is also to be understood that the appended claims are intended to cover all of such generic and specific features particular to the invention as disclosed herein and all statements relating to the scope of the invention, which as a matter of language might be said to fall thereunder.

What is claimed is:

1. A scroll type fluid machine wherein there are engaged stator scroll means and rotary scroll means in intermeshing relationship with each other, each having a lateral plate surface, a scroll blade portion projecting in the axial direction from the lateral plate surface in such a manner that said rotary scroll means may move in solar revolving motion with respect to said stator scroll means, a cup-like member fixed to and covering said stator scroll means, a front end plate fixed to said cup-like member, a main shaft journalled on said front end plate and engaged with said rotary scroll means to move it in solar revolving motion, a rotation blocking mechanism for restricting the rotary motion of said rotary scroll means and incorporated between said rotary scroll means and said front end plate, so that fluid may operatively be sucked into and delivered out of the fluid machine with a differential pressure produced therein in continued variation, characterized in that, in order to shift the angular phase relationship between said rotary scroll means and said stator scroll means in the direction of rotation of said rotary scroll means by a selected angle from initial contact of the scroll blade portions to be determined by initial wear of said scroll blade portions of said rotary and stator scroll means, indexing holes shifted for said selected angle are provided in said stator and rotary scroll means, and alignment means for securing said front end plate and cup-like member together with alignment of said indexing holes.

2. The scroll type fluid machine as claimed in claim 1, characterized in that said rotary scroll means are disposed in intermeshing relationship with said stator scroll means in such an angular phase relationship that said rotary scroll means may positively be shifted in rotation in the rotating direction thereof by an angular phase $\epsilon$ rad. as determined from the equation $\epsilon=1/1000 \cdot a/b$, when assuming an initial wear a $\mu$ in the flanks of the scroll blade portions of said both scroll means and with a radius b mm of the base circle of the involute curve in each of the flanks of said scroll blade portions.

3. A scroll type fluid machine wherein there are engaged stator scroll means and rotary scroll means in intermeshing relationship with each other, each having a lateral plate surface, a scroll blade portion projecting in the axial direction from the lateral plate surface in such a manner that said rotary scroll means may move in solar revolving motion with respect to said stator scroll means, a cup-like member fixed to and covering said stator scroll means, a front end plate fixed to said cup-like member, a main shaft journalled on said front end plate and engaged with said rotary scroll means to move it in solar revolving motion, a rotation blocking mechanism for restricting the rotary motion of said rotary scroll means and incorporated between said rotary scroll means and said front end plate, so that fluid may operatively be sucked into and delivered out of the fluid machine with a differential pressure produced therein in continued variation, characterized in that opposed surfaces of said front end plate and said cup-like member of the scroll type fluid machine are formed with retaining groove means so that a space is defined therebetween when installed together, resilient means inserted in said space in position to allow said front end plate to adjustably shift in rotating motion relatively with said cup-like member during assembly thereof, and that said front end plate and said cup-like member are finally secured together after an adjustment for initial wear was made accordingly therebeween.

4. The scroll type fluid machine as claimed in claim 3, characterized in that said opposed surfaces of said front end plate and said cup-like member are formed with retaining groove means of a triangular shape in cross-section.

5. The scroll type fluid machine as claimed in claim 3, characterized in that said opposed surfaces of said front end plate and said cup-like member are formed with retaining groove means of a quadrilateral shape including a rectangle, a trapezoid and the like in cross-section.

6. The scroll type fluid machine as claimed in claim 3, characterized in that said resilient means are a coil spring.

* * * * *